(12) United States Patent
Jördens

(10) Patent No.: US 9,911,331 B2
(45) Date of Patent: Mar. 6, 2018

(54) APPARATUS FOR DETERMINING THE DEGREE OF SHADE OF A PARKING POSITION FOR A VEHICLE

(71) Applicant: VOLKSWAGEN AG, Wolfburg (DE)

(72) Inventor: Christian Jördens, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/229,984

(22) Filed: Aug. 5, 2016

(65) Prior Publication Data

US 2017/0046957 A1 Feb. 16, 2017

(30) Foreign Application Priority Data

Aug. 10, 2015 (DE) ........................ 10 2015 215 239

(51) Int. Cl.
| | | |
|---|---|---|
| *G08B 21/00* | (2006.01) | |
| *G08G 1/14* | (2006.01) | |
| *B60H 1/00* | (2006.01) | |
| *H04Q 9/00* | (2006.01) | |

(52) U.S. Cl.
CPC ......... *G08G 1/143* (2013.01); *B60H 1/00778* (2013.01); *G08G 1/145* (2013.01); *H04Q 9/00* (2013.01); *H04Q 2209/40* (2013.01)

(58) Field of Classification Search
CPC .... B60H 1/00778; G08G 1/143; G08G 1/145; H04Q 9/00
USPC .................................................... 340/870.07
See application file for complete search history.

(56) References Cited

U.S. PATENT DOCUMENTS

| | | | |
|---|---|---|---|
| 2010/0236770 A1 | 9/2010 | Pursifull | |
| 2010/0267379 A1* | 10/2010 | Stahlin | ............. G08G 1/096716 |
| | | | 455/426.1 |
| 2013/0151088 A1 | 6/2013 | Ricci | |
| 2016/0284217 A1* | 9/2016 | Lee | ........................ G08G 1/143 |

FOREIGN PATENT DOCUMENTS

| | | |
|---|---|---|
| DE | 10106152 A1 | 8/2002 |
| DE | 10248003 A1 | 4/2004 |
| DE | 102008015232 A1 | 5/2009 |
| DE | 102007056770 A1 | 6/2009 |
| DE | 102010054081 A1 | 6/2012 |
| DE | 102011084090 A1 | 4/2013 |
| DE | 102012221179 A1 | 5/2014 |
| DE | 102013001308 A1 | 7/2014 |
| DE | 102014201195 A1 | 7/2015 |
| DE | 102014001554 A1 | 8/2015 |
| EP | 1775690 A1 | 4/2007 |
| KR | 20100013575 A | 2/2010 |

OTHER PUBLICATIONS

Search Report for German Patent Application No. 10 2015 215 239.1; Apr. 15, 2016.

* cited by examiner

*Primary Examiner* — Mark Rushing
(74) *Attorney, Agent, or Firm* — Barnes & Thornburg LLP

(57) ABSTRACT

An apparatus for determining a degree of shade for a parking position for a vehicle having a sensor device which determines an outside temperature and an interior temperature for the vehicle. The apparatus also includes an evaluation device which takes the outside temperature and the interior temperature as a basis for determining whether the vehicle is in a shaded or sunny parking position and a transmission device which sends information about the degree of shade for the parking position of the vehicle to a processing device.

14 Claims, 3 Drawing Sheets

APPARATUS FOR DETERMINING THE DEGREE OF SHADE OF A PARKING POSITION FOR A VEHICLE

PRIORITY CLAIM

This patent application claims priority to German Patent Application No. 10 2015 215 239.1, filed 10 Aug. 2015, the disclosure of which is incorporated herein by reference in its entirety.

SUMMARY

Illustrative embodiments relate to apparatuses, processing devices and methods for determining and/or transmitting a degree of shade for a parking position for a vehicle.

At high outside temperatures, it is beneficial to park a vehicle in a shaded parking space. Severe insolation results in undesirable heating of the vehicle interior, and shady parking spaces are coveted. In some vehicles, the vehicle has engine-independent ventilation fitted, but this requires a particular time before it has reduced the interior temperature to the appropriate level. Furthermore, it is generally necessary for the driver to activate the engine-independent ventilation in good time before departure.

In other situations, sunny parking spaces may also be coveted, for example, in winter, since then the vehicle is not as cold when getting in and also icy vehicle windows can thaw by themselves, for example, depending on insolation and outside temperature.

BRIEF DESCRIPTION OF THE DRAWINGS

Disclosed embodiments are described in detail below with reference to the drawings.

DETAILED DESCRIPTION OF THE DISCLOSED EMBODIMENTS

Figure 1:
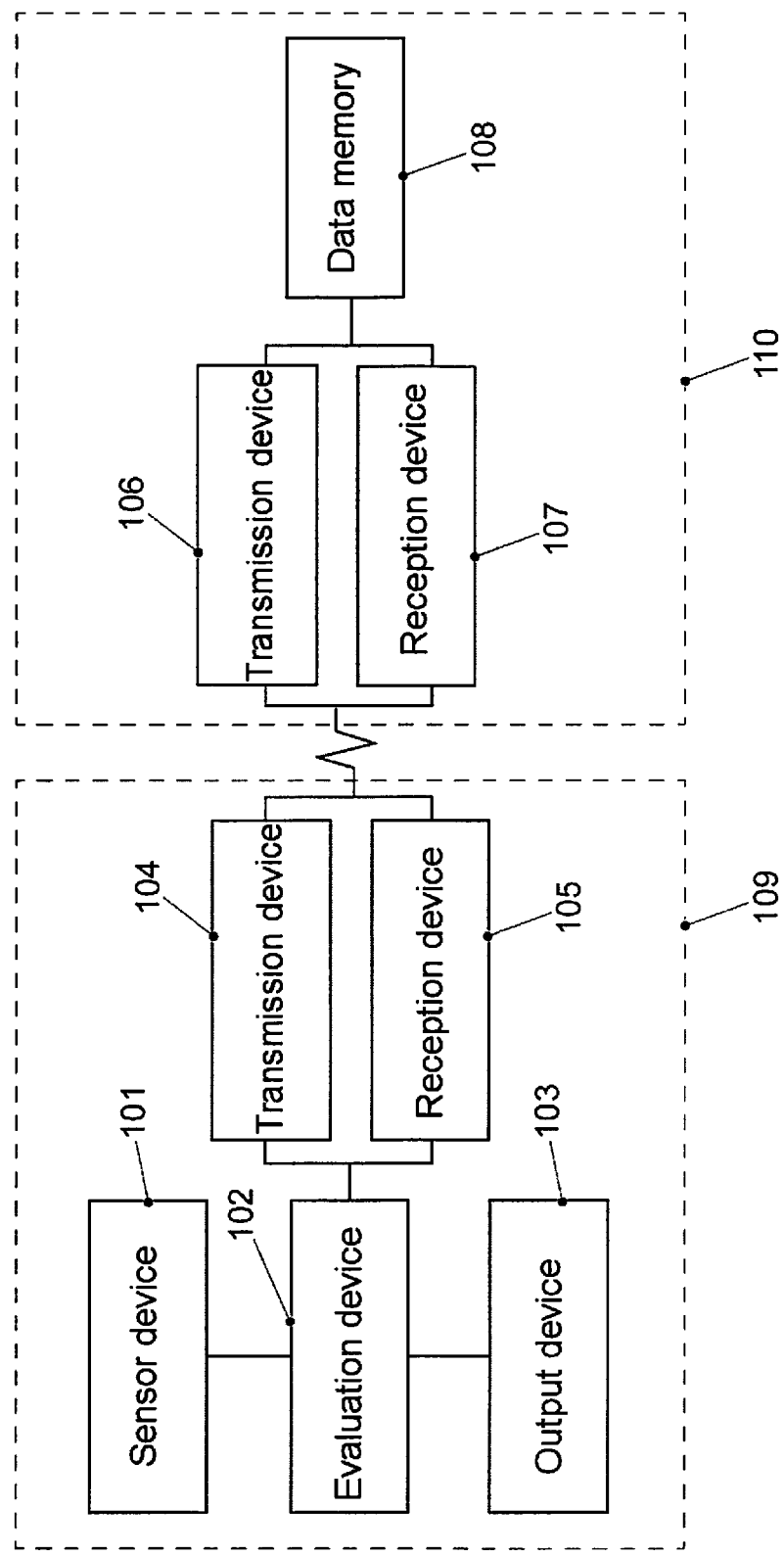
FIG. 1 shows a schematic illustration of an apparatus and a processing device according to a disclosed embodiment.

DE 101 06 152 A1 relates to control of an engine-independent ventilation system in a motor vehicle for lowering an inside temperature having a controller for the engine-independent ventilation system and at least one timer, wherein the engine-independent ventilation system is switched on for a prescribed duration when the inside temperature exceeds a prescribed limit value.

DE 10 2007 056 770 A1 relates to a ventilation and/or air conditioning system for a vehicle having a blower for taking in outside air from the surroundings of the vehicle, and to a method for controlling or regulating the ventilation and/or air conditioning system.

DE 10 2011 084 090 A1 discloses an apparatus for connecting a motor vehicle, which has a prescribed identification, to a data network. In this case, the apparatus comprises a connecting unit to set up an encrypted data connection to the motor vehicle, which data connection is designed to receive the prescribed identification. The apparatus further comprises a memory unit, which stores at least one comparison identification, and a further connecting unit, for setting up a further data connection to the data network. Furthermore, the control apparatus comprises a control unit that is designed to connect the motor vehicle to the data network via the connecting unit and the further connecting unit when the received prescribed identification of the motor vehicle matches a stored comparison identification.

DE 10 2008 015 232 A1 discloses a communication device for a vehicle for communication with a control center, wherein the communication device has a position finding unit for determining a position of the vehicle. The communication device further comprises a communication unit for setting up and maintaining a communication link to the control center and for sending the first information data to the control center by means of the communication link, wherein the communication link is based on a cellular communication network and wherein the first information data contain data about the position of the vehicle.

DE 10 2010 054 081 A1 relates to a method and an apparatus for producing parking advice for the driver of a vehicle, particularly, a motor vehicle. The position of the sun and the orientation of the vehicle are ascertained. Further, the information about the position of the sun and the ascertained orientation of the vehicle are used to ascertain a parking position for the vehicle that is distinguished by minimal heat input as a result of insolation into the vehicle, and the ascertained parking position of the vehicle is finally displayed to the driver.

The document DE 10 2009 022 280 A1 cited in the document DE 10 2010 054 081 A1 relates to a method and an apparatus for operating a vehicle, wherein the vehicle has at least one photovoltaic cell, wherein means are provided that are taken as a basis for outputting to a vehicle driver, at least when route guidance is activated, at least one piece of advice for a route and/or parking option with maximum insolation.

DE 102 48 003 A1 relates to automatic solar protection for vehicles having motor-driven shading means for covering at least one transparent vehicle bodywork area of a parked or switched-off vehicle having control means that take at least one temperature value, which is capturable by a temperature sensor provided on the vehicle, as a basis for activating the motor drive of the shading means.

US 2013/0151088 A1 relates to a method and a system for collecting vehicle data that relate to the traffic. A vehicle comprises multiple sensors to capture a piece of vehicle performance information and a piece of location information, and a data collection module to collect the vehicle performance information and the location information and to provide it for a remote node so that the latter provides the performance and location information for other vehicles.

DE 10 2014 201 195 A1 relates to autonomous vehicle operation during a parked phase to set at least one operating parameter for the motor vehicle in accordance with a user stipulation during the parked phase by operating at least one motor vehicle component. A control unit receives state data relating to at least one environmental variable acting on the at least one operating parameter during the parked phase and relating to a respective state of the at least one vehicle component, and takes the states as a basis for stipulating at least one starting time or at least one running time for the internal combustion engine. In this case, it is possible to take into consideration weather forecast data from the Internet that are received via a reception device, for example, relating to a future profile for the outside temperature and to insolation.

DE 10 2014 001 554 A1 relates to a method for automatically parking a vehicle in a parking area that has a multiplicity of parking spaces. A control device allocates a particular parking space. Further, a piece of environmental information is furnished and the environmental information is taken as a basis for rating the parking spaces. If need be, a vehicle that is in a parking space rated as less than optimum is moved by the control device to a parking space that is rated as optimum. A parking space can be rated as less than optimum if the insolation is so severe that it causes heating that exceeds a stipulated limit value for the inside temperature of the vehicle.

Shaded parking spaces that are known to the driver from his own experience can be made for by the driver according to the above documents. In this case, however, knowledge of the relevant locations is limited to the information from the driver himself.

Disclosed embodiments provide an apparatus and a method that allow a degree of shade for a parking position for a vehicle to be determined and this information to be furnished.

Disclosed embodiments provide an apparatus, a processing device, and a method.

The disclosed apparatus for determining a degree of shade for a parking position for a vehicle comprises a sensor device, wherein the sensor device is set up to determine an outside temperature and an interior temperature for the vehicle. The apparatus is characterized in that it further comprises an evaluation device, wherein the evaluation device is set up to take the outside temperature and the interior temperature as a basis for determining the degree of shade for the parking position. The apparatus further comprises a transmission device, wherein the transmission device is set up to send information about the degree of shade for the parking position of the vehicle to an external device.

By way of example, the degree of shade can indicate that a shaded parking position (shady parking space) is involved or that a sunlit parking position (sunny parking space) is involved.

The automatic determination of a degree of shade for a parking position and the sending of the information to a processing device, for example, via an online service, which processing device can in turn transmit the information to another vehicle or other vehicles, represents a high level of convenience for a driver. It allows him to be informed of where, in his proximity, a shaded parking space or a sunny parking space can currently be found. According to the disclosed embodiments, this information is available to him at all times, even when the driver is in surroundings with which he is not familiar, such as in a strange town, for example, since his practical knowledge of shaded or sunny parking spaces there is limited or nonexistent.

Furthermore, outside temperature sensors are fitted in vehicles as standard, and interior temperature sensors are integrated as standard in vehicles with a regulated air conditioning system. Determination of a level of shade for a parking position that involves the temperature values from these sensors therefore requires no new or additional components to be installed.

The apparatus further comprises a reception device, wherein the reception device is set up to receive information about a further degree of shade for a further parking position of the vehicle from the processing device. The apparatus further comprises an output device, wherein the output device is set up to output information about the further degree of shade for the further parking position of the vehicle to a driver of the vehicle.

A reception device integrated in the vehicle can therefore receive information about a degree of shade for a parking position from the processing device and communicate the position of a desired parking space, e.g., a shady parking space or a sunny parking space, to the driver at any time.

This information is determined by other vehicles that are in a shaded parking space, for example, or have been therein at another time, e.g., as described above, and is transmitted to the processing device, the latter in turn being able to use an online service to transmit the information to an integrated reception unit of another vehicle and hence to inform the driver about the position of the shaded parking space.

As an online service for a driver, automated provision of the information about shaded and/or sunny parking positions via a backend or WLAN, for example, affords a knowledge benefit over drivers whose vehicles do not have this technology. This information base is markedly superior to any practical knowledge and, in principle, available in any town in which vehicles that have the disclosed apparatus integrated travel.

On the basis of a communication between vehicle and processing device and the collection of information from different vehicles that have been in the shaded or sunny parking position, for example, updated forwarding of information about the position of a shaded or sunny parking position is ensured for the driver at any time.

In at least one exemplary embodiment, the evaluation device is set up to determine a temperature difference between outside temperature and interior temperature and to determine the degree of shade on the basis of a comparison of the temperature difference with at least one threshold value. This allows the degree of shade to be determined in a simple manner.

By way of example, it is possible to determine as the degree of shade that the vehicle is in a shaded parking position when the temperature difference is below a first threshold value for the at least one threshold value, and/or it is possible to determine that the vehicle is in a sunny parking position when the temperature difference is above a second threshold value for the at least one threshold value. The first threshold value may be equal to the second threshold value, but may also be different therefrom. By way of example, the threshold value may be in the range from 0-20 kelvin (K), for example, $\leq 1$ K, 3 K, 5 K, 8 K, 10 K, 15 K or 20 K, these values being intended to be understood merely as an example and being able to vary depending on the application. Hence, a simple threshold value comparison allows a distinction between shady parking spaces and sunny parking spaces.

Additionally or alternatively, in some exemplary embodiments, the evaluation device may be set up to determine the degree of shade on the basis of a change in the inside temperature over time and/or on the basis of a change in the outside temperature over time. By way of example, this allows an improvement in an accuracy of the determination of whether a shady parking space or a sunny parking space is involved.

By way of example, it is possible to determine as the degree of shade that the vehicle is in a shaded parking position when the interior temperature rises in the same manner as the outside temperature or the inside temperature rises with a slight delay in comparison with the outside temperature, for example, with a delay below a delay threshold value. This can reflect a typical rise in the temperature in a shady parking space after a cool night, for example, the delay in the interior temperature in comparison with the outside temperature being able to be determined by an insulation of the vehicle, for example. In this case, a suitable delay threshold value can be determined by measurements, for example.

It is also possible to establish that a shaded parking position is involved when the interior temperature remains approximately constant or falls only slowly (for example, at a rate below a rate threshold value), it also being possible for there to be a positive temperature difference in relation to the outside temperature in this case, i.e., the interior temperature may be above the outside temperature. By way of example, such a situation can arise when the vehicle was previously standing in a sunlit parking space and is then parked in a shady parking space.

Additionally or alternatively, it is possible to establish as the degree of shade that the vehicle is in a sunlit parking position when the interior temperature rises more sharply over time than the outside temperature. Such a situation can arise when a vehicle cooled by the night heats up in the sun or an air-conditioned vehicle is parked in the sun after a trip.

It is therefore possible for different situations to be identified by evaluating the profile of the interior temperature over time or in the outside temperature over time.

According to at least one disclosed embodiment, the sensor device can comprise a brightness sensor, wherein the evaluation device is set up to determine the degree of shade for the parking position on the basis of a brightness value from the brightness sensor.

A brightness sensor can be used to assess whether the sun is shining, as a result of which it is possible to infer whether it makes sense to distinguish between direct insolation and a shady parking space.

Additionally, the brightness sensor can be used to establish whether a windshield or another window of the vehicle is covered by an insulating foil or another material, for example, leading to reduced heating of the vehicle interior and hence to a reduced rise in the interior temperature. This effect can then be taken into consideration for the evaluation so as to determine the degree of shade more accurately.

A brightness sensor is moreover fitted as standard in vehicles today, which means that it is not necessary for a new component to be installed. The output values from this brightness sensor can additionally be output and made available for further use using current vehicle software. This means that no software changes are necessary.

Additionally, the evaluation device may be set up to determine whether the vehicle is in a parked state, and to determine the degree of shade only when the vehicle is in a parked state. This determination can be performed on the basis of data from a GPS sensor (for example, by establishing whether the vehicle is at the same location for a prescribed period) and/or on the basis of data from a speed sensor (for example, by establishing that the speed is zero at least for a prescribed period) and/or on the basis of information about an ignition of the vehicle, for example. In this way, it is possible to reliably establish whether the vehicle is actually parked.

According to at least one disclosed embodiment, the evaluation device may be set up to collate information about the degree of shade for the parking position with weather data.

Collation of the data, which comprise information about a shaded or a sunlit parking position, with weather data ensures that the data are ascertained only when insolation can be expected at the relevant location at a particular time. If the collation is effected explicitly by the evaluation device of the vehicle, retrieval of the weather data can be followed by the vehicle itself establishing whether determination of a level of shade makes sense or must be dispensed with.

According to at least one disclosed embodiment, the evaluation device may be set up to determine a location for the parking position, and the transmission device may be set up to send the location of the parking position to the processing device, together with the degree of shade. Hence, location-related information about the degree of shade can be stored in the processing device. By way of example, the location of the parking position can be determined on the basis of GPS data, as are frequently ascertained by navigation systems anyway, or on the basis of visual data from the parking space that are ascertained by means of a camera.

Visual location of a parking position is an alternative method to location based on GPS. GPS is restricted in shady regions with a poor line of sight to the sky. Visual location provides an additional option for determining a parking position when GPS location is not possible.

According to at least one disclosed embodiment, the evaluation device may be set up to collate information about the degree of shade for the parking position with a piece of temporal information, wherein the temporal information is able to comprise a time of day and/or a season.

The time of day has an influence on the position of the sun, and accordingly a parking position may be a sunny parking space in the morning and a shady parking space in the afternoon, for example.

The season has an influence on the foliage condition of the trees, for example, and accordingly the parking position may be a shady parking space in summer and a sunny parking space in autumn.

Accordingly, determination of a degree of shade for the parking position can thus take into consideration the time of day and the season, which optimizes determination of the degree of shade for the parking position.

According to at least one disclosed embodiment, the sensor device may further be set up to establish whether a door and/or a window and/or a hatch of the vehicle is open or closed.

Establishment of whether doors and/or windows and/or hatches of the vehicle are open or closed can provide additional information about the interior temperature of the vehicle.

According to at least one disclosed embodiment, the degree of shade for the parking position can then be determined on the basis of whether a door and/or a window and/or a hatch of the vehicle is open or closed.

Open or closed doors and/or windows and/or hatches of the vehicle can have an influence on the measured interior temperature of the vehicle. They can sometimes result in lowering of the interior temperature and hence in an influence on classification of shady parking spaces.

According to at least one disclosed embodiment, the evaluation device may be set up to determine the degree of shade for the parking position on the basis of an orientation of the vehicle in the parking position in relation to a position of the sun for the parking position.

An evaluation of the orientation of the vehicle in relation to the position of the sun, by reading the, by way of example, fitted compass of a navigation system and taking into consideration the position of the sun, which is dependent on the time of day, allows optimized determination of the degree of shade for a parking position, since the vehicle heats up more severely, for example, when the windshield is oriented directly in the direction of the insolation, for example.

According to at least one exemplary embodiment, the evaluation device may be set up to determine the degree of shade after a prescribed minimum parking time and/or repeatedly. This allows an accuracy of the determination to be increased, since after a minimum parking time or when the determination is repeated later, an influence of a previous movement by the vehicle (for example, travel through sunlit regions, travel through shady regions, etc.) on determination of the degree of shade is less and hence more accurate determination is possible.

According to at least one disclosed embodiment, a processing device, for example, a server arrangement, for sending and receiving information from vehicles can comprise a reception device, wherein the reception device is set up to receive first information about a degree of shade for a parking position from a multiplicity of vehicles. The processing device may further comprise a data memory for storing data on the basis of the received first information, wherein the reception device is further set up to receive a request for the degree of shade for the parking position from a vehicle. The processing device may further comprise a transmission device, wherein the transmission device is set up to send second information about the degree of shade for the parking position to the vehicle in response to the request on the basis of the stored data.

The information about a degree of shade for a parking position can be provided by a multiplicity of vehicles, that is to say by vehicles that have been in this parking position at another time, for example.

That is to say that under constraints, such as shady trees or buildings, for example, which do not change over a particular period, that is to say that they are constant over a timescale of weeks, it is possible for the data, that is to say that the information about the degree of shade for the parking position, to be qualitatively improved over multiple vehicles that park at the same spot.

By way of example, the storage of data on the basis of the received information about the degree of shade for the parking position allows production of a map that has a multiplicity of shaded and/or sunny parking positions on the basis of time, which are able to be retrieved from the data memory by a driver of another vehicle and are therefore reliably available to him at all times. The transmission device then, on the basis of a request, transmits the desired information to the driver, that is to say that the driver is provided with the option of when and what information he wishes to request.

According to at least one disclosed embodiment, the processing device may be set up to collate the first information about a degree of shade for the parking position with weather data.

The processing device can ascertain current weather data, for example, can request the weather data from a weather service directly and make them available to a driver of a vehicle via an online service, for example. The driver can request and retrieve the relevant data as desired.

According to at least one disclosed embodiment, a method for sending and receiving information from vehicles can comprise reception of information about a degree of shade for parking positions from a multiplicity of vehicles. The method can further comprise storage of data on the basis of the received information by means of a data memory, wherein a request for a degree of shade for a parking position can be received from a vehicle by the reception device. The method can further comprise sending of second information about a degree of shade for a parking position to the vehicle in response to the request on the basis of the stored data.

The method for sending and receiving information from vehicles has the same benefits as the benefits already discussed for the processing device for a vehicle.

According to at least one disclosed embodiment, the method for determining a degree of shade for a parking position for a vehicle can comprise determination of an outside temperature and an interior temperature for the vehicle. The method can further comprise determination of whether the vehicle is in a shaded parking position or a sunny parking position, on the basis of the outside temperature and the interior temperature. The method can further comprise sending of information about the shaded parking position or the sunny parking position of the vehicle to a processing device.

The method for determining a level of shade for a parking position for a vehicle has the same benefits as the benefits already discussed for the apparatus for a vehicle.

According to at least one disclosed embodiment, the method can comprise reception of further information about a degree of shade for a parking position of the vehicle from the processing device. The method can further comprise output of the further information about the degree of shade for the parking position of the vehicle.

The method has the same benefits as the benefits already discussed for the apparatus.

According to at least one disclosed embodiment, the method for determining whether the vehicle is in a shaded parking position or a sunny parking position can further comprise: determination of a temperature difference between outside temperature and interior temperature, and determination of the vehicle being in a shaded parking position or a sunny parking position when the temperature difference is below or above a threshold value.

The method for determining whether the vehicle is in a shaded parking position or a sunny parking position has the same benefits as the benefits already discussed for the apparatus.

According to at least one disclosed embodiment, the method for determining whether the vehicle is in a shaded parking position or a sunny parking position can be effected on the basis of a brightness value from a brightness sensor.

The method for determining whether the vehicle is in a shaded or sunny parking position has the same benefits as the benefits already discussed for the apparatus.

Features and elements that have been discussed above in relation to the apparatuses can also be applied to the methods.

According to at least one disclosed embodiment, the method for determining whether the vehicle is in a shaded or sunny parking position can be effected on the basis of a speed value from the speed sensor.

The method for determining whether the vehicle is in a shaded or sunny parking position has the same benefits as the benefits already discussed for the apparatus.

Exemplary embodiments are explained in detail below with reference to the appended drawings. These exemplary embodiments are merely examples and are not intended to be interpreted as restrictive. While the exemplary embodiments are described such that they comprise a multiplicity of features and elements, for example, some of these features can be omitted and/or replaced by alternative features or elements in other exemplary embodiments. In other exemplary embodiments, additional or alternatively additional features or elements can be provided besides those described explicitly. It is possible for variants or modifications that relate to one or more exemplary embodiments also to be applied to other exemplary embodiments, unless indicated otherwise.

FIG. 1 shows an apparatus 109 for determining a degree of shade for a parking position for a vehicle. The apparatus 109 comprises a sensor device 101, an evaluation device 102 and an output device 103.

In this case, the apparatus 109 is integrated in a vehicle and is used to establish whether a vehicle is in a shaded parking position or whether the vehicle is exposed to direct insolation after the vehicle has parked, this being established by speed sensors, the ignition and/or position data (e.g., GPS) from the vehicle, for example. A speed sensor or a GPS measurement can establish whether the vehicle is at rest, for example.

In the exemplary embodiment shown, the sensor device 101 comprises at least one first temperature sensor for determining an outside temperature and at least one second temperature sensor for determining an interior temperature for a vehicle.

Outside temperature sensors are fitted as standard in vehicles today and can determine the temperature prevailing outside the vehicle and in the immediate surroundings of the vehicle. Interior temperature sensors ascertain the temperature that prevails in the interior of the vehicle, and are fitted in vehicles having a regulated air conditioning system, for example.

The ascertained outside temperature and the ascertained interior temperature are used by the evaluation device 102 to determine a temperature difference between outside temperature and interior temperature, for example. If this temperature difference is below a defined threshold value, then it is established that the vehicle is in a shaded parking position. In this case, the threshold value for the temperature difference may be less than or equal to 20 kelvin, for example, ≤15 K, ≤10 K, ≤8 K, ≤5 K, ≤3 K or ≤1 K, other values likewise being possible and these values being intended to be understood only as an example.

If the temperature values from the outside sensor and the interior sensor are approximately the same, or differ only within a prescribed temperature value (i.e., the difference is below the threshold value), then it is assumed that the vehicle is in a shaded parking position, that is to say in a shady parking space.

If the interior temperature of the vehicle is much higher than the outside temperature, then it can be assumed that the vehicle is in the sun. In other words, it can be assumed that the vehicle is in the sun when the temperature difference is above a further threshold value. The further threshold value may be the same as the threshold value discussed above, but it is also possible for different threshold values to be used.

In general, the information obtained about the degree of shade becomes more accurate the longer the vehicle is parked, since in this way influences of the interior temperature during the trip beforehand decrease. In the case of a shady parking space, the interior temperature should then approach the exterior temperature, for example. In different exemplary embodiments, it is also possible for the above threshold values to be defined, by way of example, on the basis of parked time, for example, a higher threshold value for a shorter parked time of the vehicle and a lower threshold value for a longer parked time, since the values in the case of a shady parking space should have converged to a greater extent after the longer parked time. Additionally, the degree of shade can also be determined by evaluating the history, for example, how long the vehicle traveled beforehand and how long the vehicle was parked and at what location beforehand (for example, in a sunlit parking space or a shaded parking space).

In addition or as an alternative to determination of the degree of shade (i.e., whether a shaded parking position or a sunlit parking position is present) on the basis of the temperature difference, it is also possible to evaluate a change in the interior temperature over time and/or a change in the outside temperature over time. By way of example, it is possible to determine that a sunlit parking position is present when the interior temperature rises comparatively more sharply than the outside temperature. This may be the case, by way of example, when a car cooled by the night heats up in the sun or an air-conditioned vehicle is parked in the sun after the trip. It is also possible to establish that a shaded parking position is present when the interior temperature rises in the same manner (i.e., with approximately the same profile) simultaneously or with a slight delay in comparison with the outside temperature, this being able to be the case after a cool night. In this situation, the ambient air and the inside of the vehicle heat up in approximately the same manner as a result of the rise in the temperature at dawn in the shade, with a delay being able to result from the insulation of the vehicle. Typical delay values for such cases can be determined experimentally for a respective vehicle, for example. It is also possible to establish that a shaded parking position is involved when the inside temperature remains almost constant or falls only slowly (for example, at a rate below a prescribed rate threshold value, which can in turn be determined experimentally). In this state, the inside temperature may also be higher than the outside temperature, e.g., after a short trip from a sunny parking space to a shady parking space during which an air conditioning system has not yet completely cooled the vehicle, for example.

As mentioned above, the temperature values may be measured and evaluated only after a certain period of time has elapsed since the vehicle was parked, for example, so that the value for the interior temperature is not corrupted by an air conditioning system, for example, since a lower temperature then obviously prevails in the vehicle, which temperature does not correspond to that of the parked vehicle. The measurement and the comparison can also be performed repeatedly.

Furthermore, it is possible for determination of the temperature difference to be augmented by a collation with weather data by the vehicle. The weather data provide information about whether there is actually insolation prevailing on the day and a comparison of the temperature values actually makes sense. Brightness sensors can be used to determine the currently prevailing position of the sun, for example. Constraints such as shady trees or buildings, for example, are constant on a timescale of weeks.

The sensor device 101 can moreover comprise at least one brightness sensor. By way of example, the brightness sensor can be used to determine whether the sun is actually shining (or whether it is night, in which case determination of the degree of shade makes no sense). Additionally, the brightness sensor can be used to establish whether windows of the vehicle are covered, for example. When parking, for example, a windshield of the vehicle is sometimes covered with a reflective insulating foil by a driver or another person to reduce heating of the vehicle. Such a foil leads to reduced interior brightness, which can be detected by the brightness sensor. In this case, the fact that the vehicle heats up more slowly can be taken into consideration for the evaluation.

It is also possible for further circumstances to be used for ascertaining the degree of shade. By way of example, the evaluation can also take into consideration a time of day and a season. The time of day has an influence on the position of the sun, for example. It is thus possible for a parking space to be a sunny parking space in the morning and a shady parking space in the afternoon. The season has an influence on a foliage condition of trees or other plants, for example. Hence, a parking space may be a shady parking space in summer and a sunny parking space in autumn or winter.

Additionally, it is possible to evaluate whether windows, doors or hatches (for example, tailgates) are temporarily or permanently open. For this purpose, vehicles frequently contain sensors anyway. Such opening of hatches, doors or windows can have an influence on the interior temperature, in particular, can lower it. By way of example, heating in a sunlit parking position is usually less with windows open than with windows closed. Such effects can therefore likewise be taken into consideration for the evaluation.

Some exemplary embodiments can also involve evaluation of an orientation of the vehicle in relation to the position of the sun, for example, by reading a compass fitted in a navigation system and taking into consideration the position of the sun based on the time of day. By way of example, vehicles heat up more quickly when the windshield points precisely in the direction of the insolation. Such effects can therefore likewise be taken into consideration.

The output device 103 integrated in the apparatus can be used to indicate to the driver of the vehicle both the temperature values and the fact, ascertained therefrom, that the vehicle is in a shaded parking position.

The output device 103 can also output the aforementioned information to the driver audibly.

The transmission device 104 integrated in the apparatus 109 transmits, for example, wirelessly, the aforementioned information to a processing device 110, for example, a server. The reception device 105 integrated in the apparatus 109 can likewise receive data, for example, wirelessly, from the processing device 110 and forward the data to the evaluation device 102 and/or the output device 103, for example.

Together with the data about the degree of shade, a piece of information about the position of the parked vehicle (and hence the position of the parking space) may be transmitted. By way of example, such a position can be ascertained by a position finding unit that is present in the vehicle anyway, for example, a GPS receiver. Additionally or alternatively, it is also possible for visual location to be effected, for example, by means of cameras fitted in the vehicle. By way of example, such cameras can capture road signs or similar information that allows the position of the parking space to be inferred. In other exemplary embodiments, the position of the parking space can additionally or alternatively also be input manually.

In this case, the data from the vehicle can be transmitted to a backend via an emergency call system, what is known as an E-call unit. In this case, the backend may be a type of server system that can send and/or receive data outside the vehicle, for example, wirelessly. Wireless transmission, such as WLAN, for example, is likewise possible.

The processing device 110 comprises a transmission device 106 and a reception device 107.

In this case, the reception device 107 receives information about degrees of shade from multiple appropriately set-up vehicles simultaneously or in succession.

The processing device 110 moreover comprises a data memory 108, for storing data on the basis of the received information. In this case, the transmission device 106 sends information about a degree of shade for the parking position to the vehicle in response to the request on the basis of the stored data.

The apparatus 109 integrated in a vehicle can receive data from the processing device 110. By way of example, the apparatus 109 can send a request about a shaded parking position to the processing device 110 by means of the transmission device 104 and can then receive a response from the processing device, for example, where there is a shady parking space or sunny parking space in proximity to the vehicle. The driver of the vehicle can then use this information to drive to the relevant shaded parking space and park his vehicle there.

The transmission device 106 sends data from the processing device 110 to a vehicle or to a multiplicity of vehicles. By way of example, an entire map showing shaded parking spaces, for example, in a town, can be made available to a driver in this manner online.

By way of example, the transmission device 106 can also be used to send current weather data to one or more vehicles.

Figure 2:
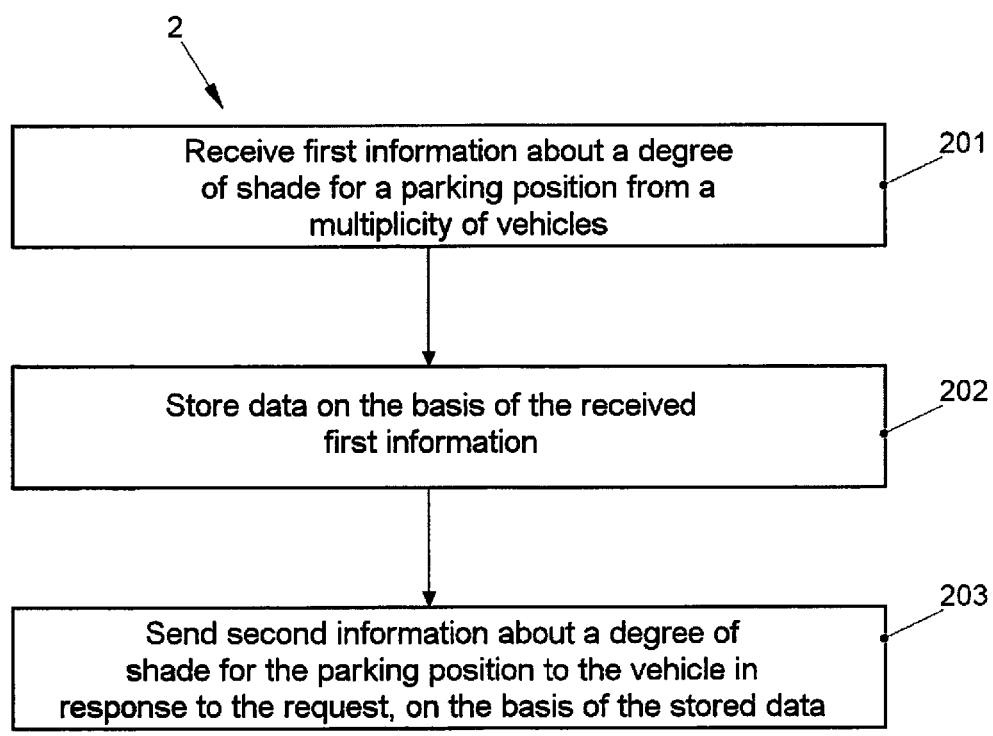
FIG. 2 shows method operations of a method according to a disclosed embodiment.

FIG. 2 shows method operations at 201-203 of a method 2 that can be performed by the processing device 110, as shown in FIG. 1, for example, but is not limited thereto.

In operation at 201 of the method 2, as shown in FIG. 2, first information about degrees of shade for parking positions is received from a multiplicity of vehicles.

In operation at 202 of the method, as shown in FIG. 2, data are stored on the basis of the received first information.

In operation at 203 of the method, as shown in FIG. 2, second information about a degree of shade for a parking position is sent to the vehicle in response to the request on the basis of the stored data.

Figure 3:
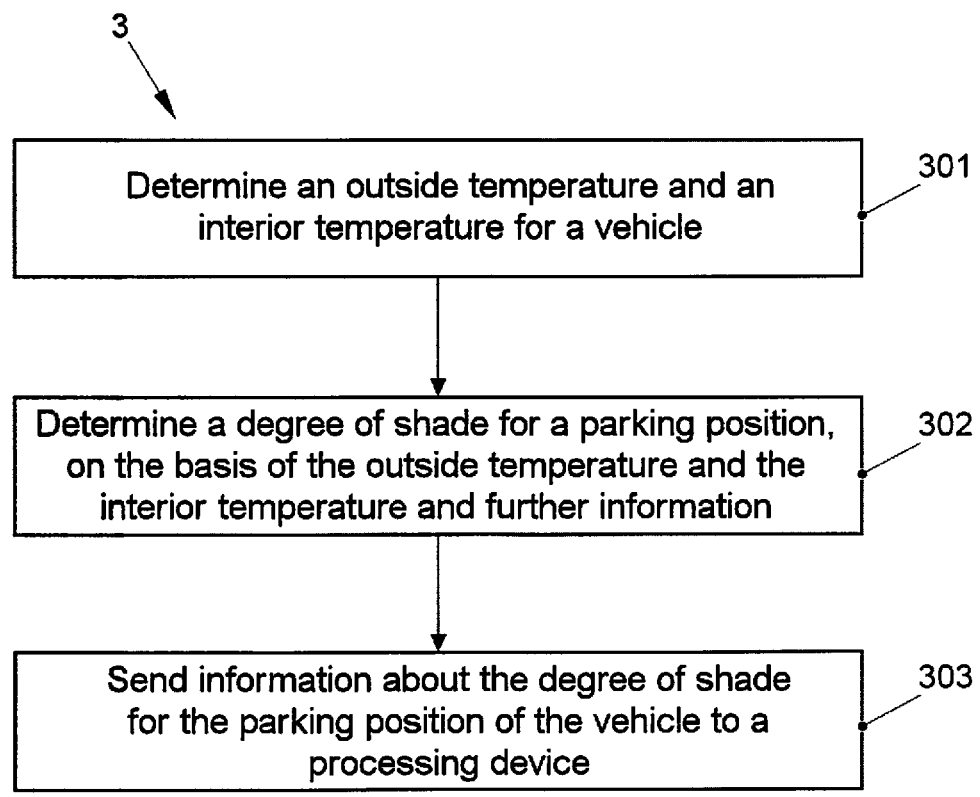
FIG. 3 shows method operations of a method according to a further disclosed embodiment.

FIG. 3 shows method operations at 301-303 of a method 3 that can be performed by the apparatus 109, as shown in FIG. 1, for example, but is not limited thereto.

In operation at 301 of the method 3, as shown in FIG. 3, an outside temperature and an interior temperature for a vehicle are determined.

In operation at 302 of the method 3, as shown in FIG. 3, a degree of shade for a parking position of the vehicle is determined on the basis of the outside temperature and the interior temperature of the vehicle. This determination can be performed as explained above for the relevant apparatus, for example.

In operation at 303 of the method 3, as shown in FIG. 3, information about the degree of shade for the parking position of the vehicle is sent to a processing device.

The disclosed apparatus and the disclosed method can already be integrated and performed in all vehicles that have a regulated air conditioning system, since the vehicles have interior temperature sensors. In other cases, sensors provided specifically for implementing the apparatuses and methods can be used. Outside temperature sensors are fitted as standard in almost every vehicle.

LIST OF REFERENCE SYMBOLS

101 Sensor device
102 Evaluation device
103 Output device
104 Transmission device
105 Reception device
106 Transmission device
107 Reception device
108 Data memory 109 Apparatus
110 Processing device
2 Method
201-203 Method operations
3 Method
301-303 Method operations

The invention claimed is:

1. An apparatus for determining a degree of shade for a parking position for a vehicle, the apparatus comprising:
   a sensor device positioned and configured to determine an outside temperature and an interior temperature for the vehicle;
   an evaluation device set up to determine a degree of shade for the parking position of the vehicle based on the outside temperature and the interior temperature, wherein the evaluation device determines whether the vehicle is in a parked state, and determines the degree of shade only when the vehicle is in a parked state;
   a transmission device set up to send information about the degree of shade for the parking position of the vehicle to a processing device outside the vehicle;
   a reception device provided to receive information about a further degree of shade for a further parking position from the processing device; and
   an output device configured to output information about the further degree of shade for the further parking position to a driver of the vehicle.

2. The apparatus of claim 1, wherein the evaluation device determines a temperature difference between outside temperature and interior temperature and determines the degree of shade based on a comparison of the temperature difference with at least one threshold value.

3. The apparatus of claim 1, wherein the evaluation device determines the degree of shade based on a change in the inside temperature over time and/or based on a change in the outside temperature over time.

4. The apparatus of claim 2, wherein the evaluation device determines by the degree of shade that the vehicle is in a shaded parking position when
   the temperature difference is below a first threshold value for the at least one threshold value, and/or
   the interior temperature rises in the same way as the outside temperature and/or
   the interior temperature rises with a delay below a delay threshold value in comparison with the outside temperature, and/or
   the interior temperature remains approximately constant or falls at a rate below a rate threshold value, and/or
   wherein the evaluation device establishes by the degree of shade that the vehicle is in a sunny parking position when the temperature difference is above a second threshold value for the at least one threshold value, and/or
   the interior temperature rises more sharply over time than the outside temperature.

5. The apparatus of claim 1, wherein the sensor device comprises a brightness sensor, wherein the evaluation device determines the degree of shade for the parking position based on a brightness value from the brightness sensor.

6. The apparatus of claim 1, wherein the evaluation device collates information about the degree of shade for the parking position with weather data.

7. The apparatus of claim 1, wherein the evaluation device determines a location for the parking position, wherein the transmission device sends the location of the parking position to the processing device.

8. The apparatus of claim 1, wherein the evaluation device collates information about the degree of shade for the parking position with a piece of temporal information, wherein the temporal information comprises a time of day and/or a season.

9. The apparatus of claim 1, wherein the sensor device further establishes whether a door and/or a window and/or a hatch of the vehicle is open or closed, and wherein the sensor device further determines the degree of shade for the parking position based on whether a door and/or a window and/or a hatch of the vehicle is open or closed.

10. The apparatus of claim 1, wherein the evaluation device determines the degree of shade for the parking position based on an orientation of the vehicle in the parking position in relation to a position of the sun.

11. The apparatus of claim 1, wherein the evaluation device determines the degree of shade after a prescribed minimum parking time and/or repeatedly.

12. A processing device for sending and receiving information from parked vehicles, the processing device comprising:
    a reception device, wherein the reception device receives, during operation, first information about a degree of shade for parking positions from a multiplicity of parked vehicles;
    a data memory that stores, during operation, data based on the received first information, wherein the reception device further receives, during operation, a request for a degree of shade for a parking position from a vehicle; and
    a transmission device, wherein the transmission device sends, during operation, second information about the degree of shade for the parking position to the vehicle in response to the request based on the stored data.

13. The processing device of claim 12, wherein the processing device collates the first information about a degree of shade for the parking position with weather data.

14. A method for sending and receiving information from vehicles, the method comprising:
    receiving information about a degree of shade for parking positions from a multiplicity of parked vehicles;
    storing data based on the received information by a data memory;
    receiving a request for a degree of shade for a parking position from a vehicle; and
    sending second information about the degree of shade for the parking position to the vehicle in response to the request based on the stored data.

* * * * *